United States Patent
Corbin et al.

(10) Patent No.: US 6,505,977 B2
(45) Date of Patent: Jan. 14, 2003

(54) SYSTEM AND METHOD FOR DIGITAL COLOR DYE FILM PROCESSING

(75) Inventors: Douglas E. Corbin, Austin, TX (US); Stacy S. Cook, Austin, TX (US); Robert S. Young, Jr., Austin, TX (US); Alexei L. Krasnoselski, Austin, TX (US)

(73) Assignee: Applied Science Fiction, Inc., Austin, TX (US)

( * ) Notice: Subject to any disclaimer, the term of this patent is extended or adjusted under 35 U.S.C. 154(b) by 0 days.

(21) Appl. No.: 09/751,473

(22) Filed: Dec. 29, 2000

(65) Prior Publication Data

US 2001/0033750 A1 Oct. 25, 2001

Related U.S. Application Data

(60) Provisional application No. 60/174,055, filed on Dec. 30, 1999, provisional application No. 60/173,775, filed on Dec. 30, 1999, and provisional application No. 60/180,477, filed on Feb. 3, 2000.

(51) Int. Cl.⁷ .......................... G03D 5/00; G03D 13/00
(52) U.S. Cl. ....................... 396/567; 396/569; 396/604; 396/639
(58) Field of Search ..................... 396/604, 567–570; 355/27–29, 38, 67–69, 77; 358/471, 487

(56) References Cited

U.S. PATENT DOCUMENTS

| | | | |
|---|---|---|---|
| 2,404,138 A | 7/1946 | Mayer | 95/94 |
| 3,520,689 A | 7/1970 | Nagae et al. | 96/55 |
| 3,520,690 A | 7/1970 | Nagae et al. | 96/55 |
| 3,587,435 A | 6/1971 | Chioffe | 95/93 |
| 3,615,479 A | 10/1971 | Kohler et al. | 96/48 |
| 3,615,498 A | 10/1971 | Aral et al. | 96/55 |
| 3,617,282 A | 11/1971 | Bard et al. | 96/59 |
| 3,747,120 A | 7/1973 | Stemme | 346/75 |
| 3,833,161 A | 9/1974 | Krumbein | 226/92 |
| 3,903,541 A | 9/1975 | Von Meister et al. | 354/317 |
| 3,946,398 A | 3/1976 | Kyser et al. | 346/1 |
| 3,959,048 A | 5/1976 | Stanfield et al. | 156/94 |
| 4,026,756 A | 5/1977 | Stanfield et al. | 156/554 |

(List continued on next page.)

FOREIGN PATENT DOCUMENTS

| | | | | |
|---|---|---|---|---|
| EP | 0 261 782 A2 | 8/1987 | | H04N/1/46 |
| EP | 0 422 220 A1 | 3/1989 | | A61B/6/03 |
| EP | 0 482 790 B1 | 9/1991 | | H04N/1/40 |

(List continued on next page.)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, 1994, pp. 546–550.

(List continued on next page.)

Primary Examiner—D. Rutledge
(74) Attorney, Agent, or Firm—Dinsmore & Shohl LLP

(57) ABSTRACT

One aspect of the invention is a digital dye color film processing system. In one embodiment, the digital dye color film processing system includes a developer station, a processing station, a scanning system, and a data processing system. The developer station applies a developer solution to a silver halide based film to produce metallic silver grains and at least one dye image within the film. The processing station then applies at least one processing solution to the film to convert the silver halide and/or metallic silver to a substantially transparent silver complex. The scanning system then scans the coated film and produces sensor data that is communicated to a data processing system that processes the sensor data to produce a digital image The digital image can then be output to an output device, such as a printer, display monitor, memory device, and the like.

78 Claims, 5 Drawing Sheets

U.S. PATENT DOCUMENTS

| | | | |
|---|---|---|---|
| 4,081,577 A | 3/1978 | Horner | 427/424 |
| 4,142,107 A | 2/1979 | Hatzakis et al. | 250/571 |
| 4,215,927 A | 8/1980 | Grant et al. | 354/317 |
| 4,249,985 A | 2/1981 | Stanfield | 156/554 |
| 4,265,545 A | 5/1981 | Slaker | 356/431 |
| 4,301,469 A | 11/1981 | Modeen et al. | 358/75 |
| 4,490,729 A | 12/1984 | Clark et al. | 346/75 |
| 4,501,480 A | 2/1985 | Matsui et al. | 354/298 |
| 4,564,280 A | 1/1986 | Fukuda | 354/317 |
| 4,594,598 A | 6/1986 | Iwagami | 346/140 |
| 4,621,037 A | 11/1986 | Kanda et al. | 430/30 |
| 4,623,236 A | 11/1986 | Stella | 354/318 |
| 4,633,300 A | 12/1986 | Sakai | 358/41 |
| 4,636,808 A | 1/1987 | Herron | 346/75 |
| 4,666,307 A | 5/1987 | Matsumoto et al. | 356/404 |
| 4,670,779 A | 6/1987 | Nagano | 358/75 |
| 4,736,221 A | 4/1988 | Shidara | 354/317 |
| 4,741,621 A | 5/1988 | Taft et al. | 356/376 |
| 4,745,040 A | 5/1988 | Levine | 430/21 |
| 4,755,844 A | 7/1988 | Tsuchiya et al. | 354/317 |
| 4,777,102 A | 10/1988 | Levine | 430/21 |
| 4,796,061 A | 1/1989 | Ikeda et al. | 355/73 |
| 4,814,630 A | 3/1989 | Lim | 250/578 |
| 4,821,114 A | 4/1989 | Gebhardt | 358/75 |
| 4,845,551 A | 7/1989 | Matsumoto | 358/80 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 354/325 |
| 4,969,045 A | 11/1990 | Haruki et al. | 358/228 |
| 4,994,918 A | 2/1991 | Lingemann | 358/214 |
| 5,027,146 A | 6/1991 | Manico et al. | 354/299 |
| 5,034,767 A | 7/1991 | Netz et al. | 354/317 |
| 5,101,286 A * | 3/1992 | Patton | 358/487 |
| 5,124,216 A | 6/1992 | Giapis et al. | 430/30 |
| 5,155,596 A | 10/1992 | Kurtz et al. | 358/214 |
| 5,196,285 A | 3/1993 | Thomson | 430/30 |
| 5,200,817 A | 4/1993 | Birnbaum | 358/80 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blackman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,334,247 A | 8/1994 | Columbus et al. | 118/411 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/501 |
| 5,371,542 A | 12/1994 | Pauli et al. | 348/262 |
| 5,391,443 A | 2/1995 | Simons et al. | 430/21 |
| 5,414,779 A | 5/1995 | Mitch | 382/199 |
| 5,416,550 A | 5/1995 | Skye et al. | 354/298 |
| 5,418,119 A | 5/1995 | Simons | 430/507 |
| 5,418,597 A | 5/1995 | Lahcanski et al. | 355/76 |
| 5,432,579 A | 7/1995 | Tokuda | 354/293 |
| 5,432,580 A * | 7/1995 | Tokuda | 396/570 |
| 5,436,738 A | 7/1995 | Manico | 358/503 |
| 5,440,365 A | 8/1995 | Gates et al. | 354/298 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 358/500 |
| 5,477,345 A | 12/1995 | Tse | 358/500 |
| 5,496,669 A | 3/1996 | Pforr et al. | 430/22 |
| 5,516,608 A | 5/1996 | Hobbs et al. | 430/30 |
| 5,519,510 A | 5/1996 | Edgar | 358/471 |
| 5,546,477 A | 8/1996 | Knowles et al. | 382/242 |
| 5,550,566 A | 8/1996 | Hodgson et al. | 345/202 |
| 5,552,904 A | 9/1996 | Ryoo et al. | 358/518 |
| 5,563,717 A | 10/1996 | Koeng et al. | 358/406 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,587,752 A | 12/1996 | Petruchik | 396/315 |
| 5,596,415 A | 1/1997 | Cosgrove et al. | 358/296 |
| 5,627,016 A | 5/1997 | Manico | 430/434 |
| 5,649,260 A | 7/1997 | Wheeler et al. | 396/569 |
| 5,664,253 A | 9/1997 | Meyers | 396/603 |
| 5,664,255 A | 9/1997 | Wen | 396/627 |
| 5,667,944 A | 9/1997 | Reem et al. | 430/359 |
| 5,678,116 A | 10/1997 | Sugimoto et al. | 396/611 |
| 5,691,118 A | 11/1997 | Haye | 430/357 |
| 5,695,914 A | 12/1997 | Simon et al. | 430/379 |
| 5,698,382 A | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,771,107 A | 6/1998 | Fujimoto et al. | 358/464 |
| 5,790,277 A | 8/1998 | Edgar | 358/487 |
| 5,835,795 A | 11/1998 | Craig et al. | 396/6 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,959,720 A | 9/1999 | Kwon et al. | 355/38 |
| 5,963,662 A | 10/1999 | Vachtsevanos et al. | 382/150 |
| 5,966,465 A | 10/1999 | Keith et al. | 382/232 |
| 5,979,011 A | 11/1999 | Miyawaki et al. | 15/308 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,065,824 A | 5/2000 | Bullock et al. | 347/19 |
| 6,069,714 A | 5/2000 | Edgar | 358/487 |
| 6,088,084 A | 7/2000 | Nishio | 355/75 |
| 6,089,687 A | 7/2000 | Helterline | 347/7 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |
| 6,200,738 B1 | 3/2001 | Takano et al. | 430/362 |

FOREIGN PATENT DOCUMENTS

| | | | |
|---|---|---|---|
| EP | 0 525 886 A3 | 7/1992 | G03D/5/00 |
| EP | 0 580 293 A1 | 6/1993 | H04N/1/04 |
| EP | 0 580 293 A1 | 1/1994 | H04N/1/04 |
| EP | 0 580 293 A | 1/1994 | H04N/1/04 |
| EP | 0 601 364 A1 | 6/1994 | H04N/1/387 |
| EP | 0 669 753 A2 | 2/1995 | H04N/1/407 |
| EP | 0 768 571 A2 | 4/1997 | G03D/13/00 |
| EP | 0 794 454 A2 | 9/1997 | G03B/27/73 |
| EP | 0 806 861 A1 | 11/1997 | H04N/1/00 |
| EP | 0 878 777 A2 | 11/1998 | G06T/5/40 |
| EP | 0 930 498 A2 | 7/1999 | G01N/21/88 |
| WO | WO 90/01240 | 2/1990 | H04N/1/40 |
| WO | WO 91/09493 | 6/1991 | H04N/5/217 |
| WO | WO 97/25652 | 7/1997 | G03D/5/00 |
| WO | WO 98/19216 A | 5/1998 | G03C/5/29 |
| WO | WO 98/19216 | 5/1998 | G03C/5/29 |
| WO | WO 98/25399 A1 | 6/1998 | H04N/1/38 |
| WO | WO 98/25399 A | 6/1998 | H04N/1/38 |
| WO | WO 98/25399 | 6/1998 | G04N/1/38 |
| WO | 98-31142 A * | 7/1998 | |
| WO | WO 98/31142 | 7/1998 | H04N/5/253 |
| WO | WO 98/34157 | 8/1998 | |

| | | | |
|---|---|---|---|
| WO | WO 98/34157 A | 8/1998 | |
| WO | WO 98/34157 A2 | 8/1998 | |
| WO | WO 98/34397 | 8/1998 | |
| WO | WO 99/43148 | 8/1999 | ............ H04N/1/00 |
| WO | WO 99/43149 A1 | 8/1999 | ............ H04N/1/00 |
| WO | WO 01/01197 | 1/2001 | ............ G03D/5/00 |
| WO | WO 01/01197 A | 1/2001 | ............ G03D/5/00 |
| WO | WO 01/13174 A1 | 2/2001 | ............ G03D/5/06 |
| WO | WO 01/13174 | 2/2001 | ............ G03D/5/06 |
| WO | WO 01/45042 A1 | 6/2001 | ............ G06T/5/00 |
| WO | WO 01/50192 A1 | 7/2001 | ............ G03G/7/407 |
| WO | WO 01/50193 A1 | 7/2001 | ............ G03C/7/407 |
| WO | WO 01/50194 A1 | 7/2001 | ............ G03C/7/407 |
| WO | WO 01/50197 A1 | 7/2001 | ............ G03C/7/42 |
| WO | WO 01/52556 A2 | 7/2001 | ............ H04N/9/11 |

OTHER PUBLICATIONS

"Anisotropic Spectral Magnitude Estimation Filters for Noise Reduction and Image Enhancement", T. Aach, et al., Philips GmbH Research Laboratories, IEEE, pp. 335–338, 1996.

"Adaptive–neighborhood filtering of images corrupted by signal–dependent noise", R. Rangayyan, et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing,", D. Stimpson, et al., Research Reports, BioTechniques, vol. 25, No. 5, pp. 886–890, 1998.

"Low–Cost Display Assembly and Interconnect Using Ink–Jet Printing Technology", D. Hayes, et al., Display Works '99, MicroFab Technologies, Inc., pp. 1–4, 1999.

"Ink–Jet Based Fluid Microdispensing in Biochemical Applications", D. Wallace, MicroFab Technologies, Inc., Laboratory Automation News, vol. 1, No. 5, pp. 3, Nov. 6–9, 1996.

"Photorealistic Ink–Jet Printing Through Dynamic Spot Size Control", D. Wallace, et al., Journal of Imaging Science and Technology, vol. 40, No. 5, pp. 390–395, Sep./Oct. 1996.

"MicroJet Printing of Solder and Polymers for Multi–Chip Modules and Chip–Scale Package", D. Hayes, et al., Micro-Fab Technologies, Inc. (6 pages).

"A Method of Characteristics Model of a Drop–on–Demand Ink–Jet Device Using an Integral Method Drop Formation Model", D. Wallace, MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

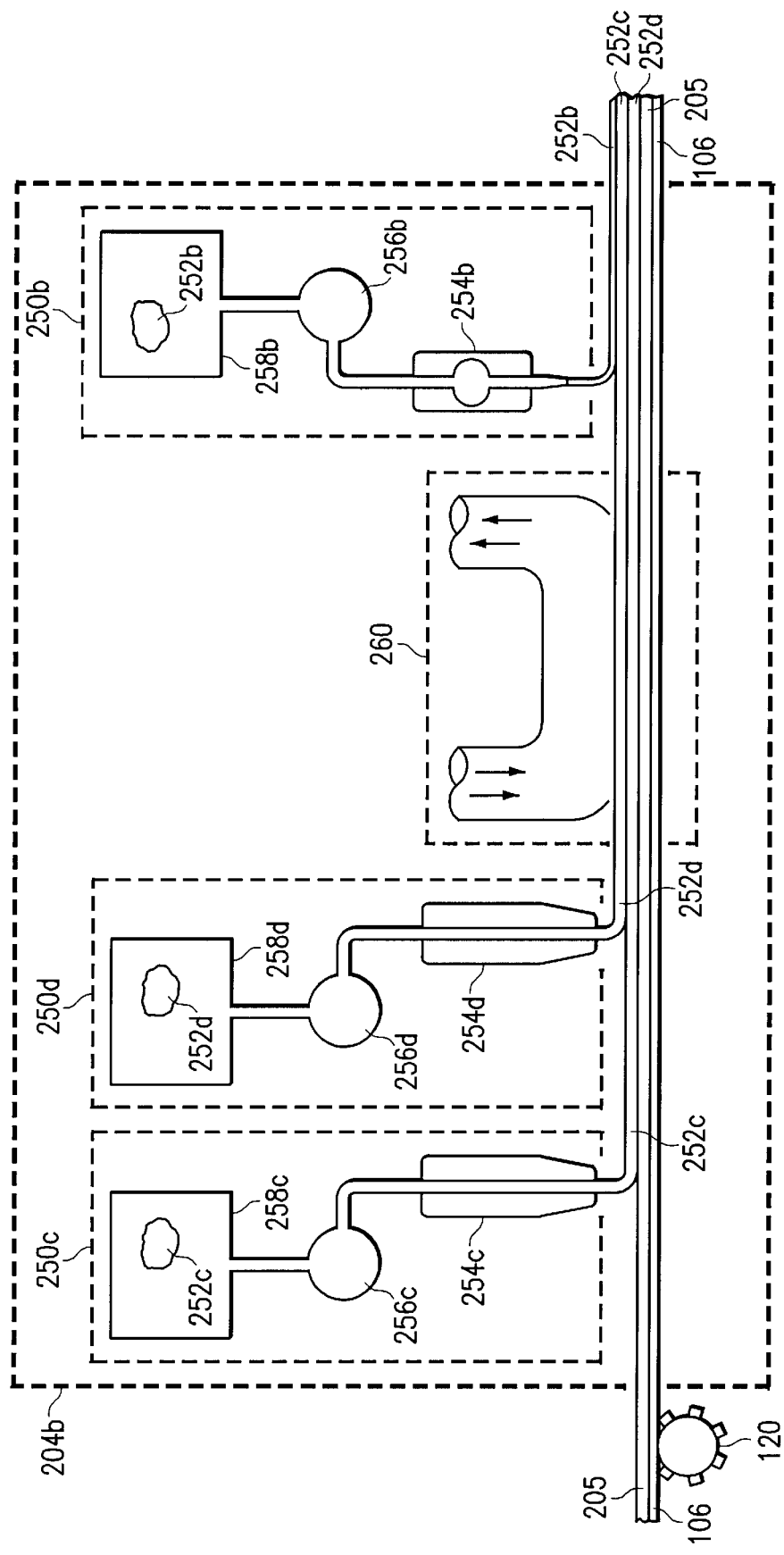

SYSTEM AND METHOD FOR DIGITAL COLOR DYE FILM PROCESSING

RELATED APPLICATIONS

This application claims priority under 35 U.S.C. §119(e) of the following United States Provisional Patent Applications: System and Method for Digital Film Development Using Visible Light, Ser. No. 60/174,055, and filed on Dec. 30, 1999; Improved System and Method for Digital Film Development Using Visible Light, Ser. No. 60/173,775, and filed on Dec. 30, 1999; and Method and System for Capturing Film Images, Ser. No. 60/180,477, and filed on Feb. 3, 2000.

This application is related to the following copending United States Patent Applications: System and Method for Digital Film Development Using Visible Light, Ser. No. 09/752,013, and having a priority filing date of Dec. 30, 1999; Improved System and Method for Digital Film Development Using Visible Light, Ser. No. 09/751,378, and having a priority filing date of Dec. 30, 1999; Method and System for Capturing Film Images, Ser. No. 09/774,544, and having a priority filing date of Feb. 3, 2000; and Scanning Apparatus and Digital Film Processing Method, Ser. No. 09/751,403, and having a priority filing date of Dec. 30, 1999; and Film Having a Selective Antihalation Layer, Ser. No. 09/522,655, and having a priority filing date of Feb. 3, 2000.

TECHNICAL FIELD OF THE INVENTION

This invention relates generally to the field of electronic film processing and more particularly to a system and method for digital color dye film processing.

BACKGROUND OF THE INVENTION

Images are used to communicate information and ideas. Images, including print pictures, film negative, documents and the like are often digitized to produce a digital image that can then be instantly communicated, viewed, enhanced, modified, printed or stored. The increasing use and flexibility of digital images, as well as the ability to instantly communicate digital images, has led to a rising demand for improved systems and methods for film processing and the digitization of film based images into digital images. Film based images are traditionally digitized by electronically scanning a film negative or film positive that has been conventionally developed using a wet chemical developing process, as generally described below.

Undeveloped film generally includes a transparent base and one or more emulsion layers containing a dye coupler and a photosensitive material, such as silver halide, that is sensitive to electromagnetic radiation, i.e., light. In color films, independent emulsion layers are sensitized to different bands, or colors, of light. In general, one or more emulsion layers are sensitized to light associated with the colors of red, green and blue. When a picture is taken, the photosensitive material is exposed to light from a scene material to produce a chemical change in the photosensitive material. The greater the intensity of light interacting with the photosensitive material, the greater the chemical change in the photosensitive material. The photographic film can then be chemically processed to produce a fixed image of the scene based on this chemical change.

In a traditional wet chemical developing process, the film is immersed and agitated in a series of tanks containing different processing solutions. The first tank typically contains a developing solution. The developing solution chemically reacts with the exposed silver halide to produce elemental silver grains in each emulsion layer of the film. The metallic silver forms a silver image within each emulsion layer of the film. The by-product of the chemical reaction combines with the dye coupler in each emulsion layer to create a dye cloud around each developing silver halide grain. The color of the dye cloud is complementary to the band of light to which the emulsion layer has been sensitized. For example, the red sensitized layer typically produces a cyan dye image, the green sensitized layer a magenta dye image, and the blue sensitized layer a yellow dye image. The density of the silver image and the corresponding dye image in each emulsion layer are typically directly proportional to the logarithm of the intensity of light to which the film was exposed. The developing process is generally stopped by removing the film from the developer tank and rinsing the developing solution from the film with water or an acidic solution.

Conventional wet chemical developing processes remove both the silver image and the undeveloped silver halide grains from the film to produce a film negative having only a dye image within the film negative. To remove the silver image and undeveloped silver halide, the developed film is immersed and agitated in a tank of bleaching solution. The bleaching solution chemically oxidizes the metallic silver forming the silver image and converts the silver image into silver halide. The bleached film is then immersed and agitated in a tank of fixer solution. The fixer solution removes the silver halide from the film by substantially dissolving the silver halide crystals. The fixer solution is thereby contaminated with dissolved silver compounds and becomes a hazardous waste byproduct of the wet chemical developing process. The film is then washed, stabilized and dried to produce a conventional film negative. The film negative can then be used to produce a corresponding image on photographic paper by methods known to those skilled in the art.

Conventional film digitization processes scan the film negative using a conventional electronic scanner to produce a digital image that electronically represents the original scene. Conventional electronic film scanners generally operate by directing white light through the film negative. The light interacts with the dye clouds forming the image, i.e. the dye image, and the intensity of the red, green and blue light passing through the film are recorded by a sensor. The sensor data is used to produce the digital image.

A relatively new process under development is digital film processing (DFP). DFP systems directly scan the film during the development process. In particular, instead of scanning the dye image in the film, conventional DFP systems scan the silver image formed in the emulsion layers while the film is developing. In conventional DFP systems, the film is scanned using infrared light. Scanning with infrared light prevents the film from being fogged and allows the developing film to be scanned at different times during the development process in order to acquire image data at different exposure levels.

The DFP scanning process is generally accomplished by measuring infrared light reflected from the developed silver image in the front and back emulsion layers, and measuring the infrared light transmitted through the film. The reflected and transmitted light measurements of the film provide image data from the blue, red, and green sensitized emulsion layers, respectively. The measured reflected and transmitted light data is processed to produce the digital image.

SUMMARY OF THE INVENTION

One embodiment of the invention is a digital color dye film processing system for developing and scanning silver halide based film. In this embodiment, the digital color dye film processing system comprises an applicator station, a processing station, a scanning station, and a data processing system. The applicator station operates to coat a developer solution on the film. The development solution interacts with the exposed silver halide within the film to produce metallic silver grains. The processing station operates to coat at least one processing solution on the film. The processing solution substantially oxidizes the metallic silver grains and dissolves the silver halide. The scanning system operates to scan the film coated with the developer solution and the processing solution to produce sensor data. The data processing system operates to receive and process the sensor data to produce a digital image. In a particular embodiment, the scanning system scans the film with visible light and infrared light. The infrared light detects any occlusions within the film and the visible light detects the dye images as well as any occlusions within the film. The sensor data corresponding to the visible light and infrared light is processed by the data processing system to correct for the occlusions within the film.

Another embodiment of the invention is a system for processing silver halide based film. In this embodiment, the system comprises an applicator station, a development station, and a processing station. The applicator station operates to apply a developer solution onto the film. The development solution interacts with the silver halide in the film to produce metallic silver grains and at least one dye image within the film. The development station operates to substantially control the environment surrounding the film during development of the film. The processing station operates to apply at least one processing solution to the film, wherein the processing solution substantially oxidizes the metallic silver grains to produce silver halide and dissolve the silver halide. In a particular embodiment, the at least one processing solution comprises a blix processing solution. A blix solution is a processing solution, which includes the functionality of both a bleach and a fixer. In another embodiment, the at least one processing solution comprises a bleach processing solution and a fixer processing solution.

Another embodiment of the invention is a system for digitizing a developed film. The system comprises a lighting system and a sensor system. The lighting system operates to illuminate developed film coated with a developer solution and at least one processing solution. The sensor system operates to measure the illumination from the film and produce sensor data. In a particular embodiment, the illumination produced by the lighting system comprises visible and infrared light. In another embodiment, the sensor system includes a mirror for separating the visible light and the infrared light. In this embodiment, the mirror may comprise a hot mirror or a cold mirror.

A particular implementation of the invention is a method for digitizing film. In this implementation, the method comprises illuminating a film coated with a developer solution and at least one processing solution, and measuring the illumination from the film and producing sensor data. In a particular implementation, the method includes processing the sensor data to compensate for any occlusions within the film to produce a corrected digital image. The corrected digital image can be printed, stored, communicated over the Internet, displayed, and enhanced.

Another implementation of the invention is a method for developing and digitizing exposed film having multiple emulsion layers containing silver halide. In this implementation, the method comprises applying a developer solution to the film to produce metallic silver grains and a dye image within the film, then applying at least one processing solution to the film, wherein the processing solution operates to oxidize the metallic silver grains and dissolve the silver halide in the film. The coated film is then scanned with light and the resulting sensor data is processed to produce a digital image. In a particular implementation, the sensor data is processed to compensate for any occlusions within the film to produce digital image. In a specific implementation, the sensor data is processed by calculating a correction factor for each pixel based on an infrared record and applying the correction factor to the red, green, and blue records for each pixel to produce the digital image. In another implementation, the method includes drying the coated film prior to scanning the coated film.

Yet another embodiment of the invention is a coated film negative produced by a process that comprises applying a developer solution to a film having silver halide to produce metallic silver grains and a dye image within the film, applying at least one processing solution to the film, wherein the processing solution operates to oxidize the metallic silver grains and dissolve the silver halide in the film; and drying the developer solution and the processing solutions on the film to produce the coated film negative.

Yet another embodiment of the invention is a digital image produced by a process that includes illuminating a film coated with a developer solution and at least one processing solution, measuring the illumination from the film and producing sensor data that is processed to produce the digital image.

The invention has several important technical advantages. Various embodiments of the invention may have none, some, or all of these advantages. An advantage of at least one embodiment is that environmentally hazardous effluents are not created by the removal of silver from the film. In particular, no water plumbing is required to process the film in accordance with at least one embodiment of the invention. As a result, this embodiment is less expensive that conventional wet chemical processing systems and can be located at any location. In contrast, conventional wet chemical processing of film often requires water plumbing and removes the silver from the film, which produces environmentally hazardous effluents that are controlled by many government regulatory agencies.

Another advantage of at least one embodiment of the invention is that the invention can be embodied in a simple user operated film processing system, such as a self-service kiosk. In this embodiment, skilled technicians are not required, thereby reducing the cost associated developing and processing film. In addition, at least one embodiment of the invention allows the film to be developed and processed faster than conventional wet chemical processing of the film.

Yet another advantage of at least one embodiment is that optical occlusions scanned during the digitization process can be substantially removed from the digital image. Optical occlusions may be caused by residual silver within the film, opacity, particulate, or any other defect that blocks light transmitted through the film. As a result, the quality of the digital image can be improved.

Other technical advantages will be readily apparent to one skilled in the art from the following figures, descriptions, and claims.

BRIEF DESCRIPTION OF THE DRAWINGS

For a more complete understanding of the invention and the advantages thereof, reference is now made to the following description taken in conjunction with the accompanying drawings, wherein like reference numerals represent like parts, in which:

FIGS. 2B–2C are schematic diagrams illustrating various embodiment of a development station shown in FIG. 2A;

DETAILED DESCRIPTION OF THE INVENTION

FIGS. 1 through 4 illustrate various embodiments of a method and system for digital color dye film processing. As described in greater detail below, the method and system for digital color dye film processing develops and processes the film to dissolve the silver and produce a silver compound that is substantially transparent to light. In particular, the film is coated with processing solutions to oxidize the developed metallic silver grains and dissolve the silver halide to produce a silver compound that is substantially transparent. The processing solutions are not removed from the film and the silver is contained as a silver compound within the film. An advantage of at least one embodiment of the method and system for digital color dye film processing is that environmentally hazardous effluents are substantially reduced or eliminated as compared to conventional wet chemical film processing.

Figure 1:
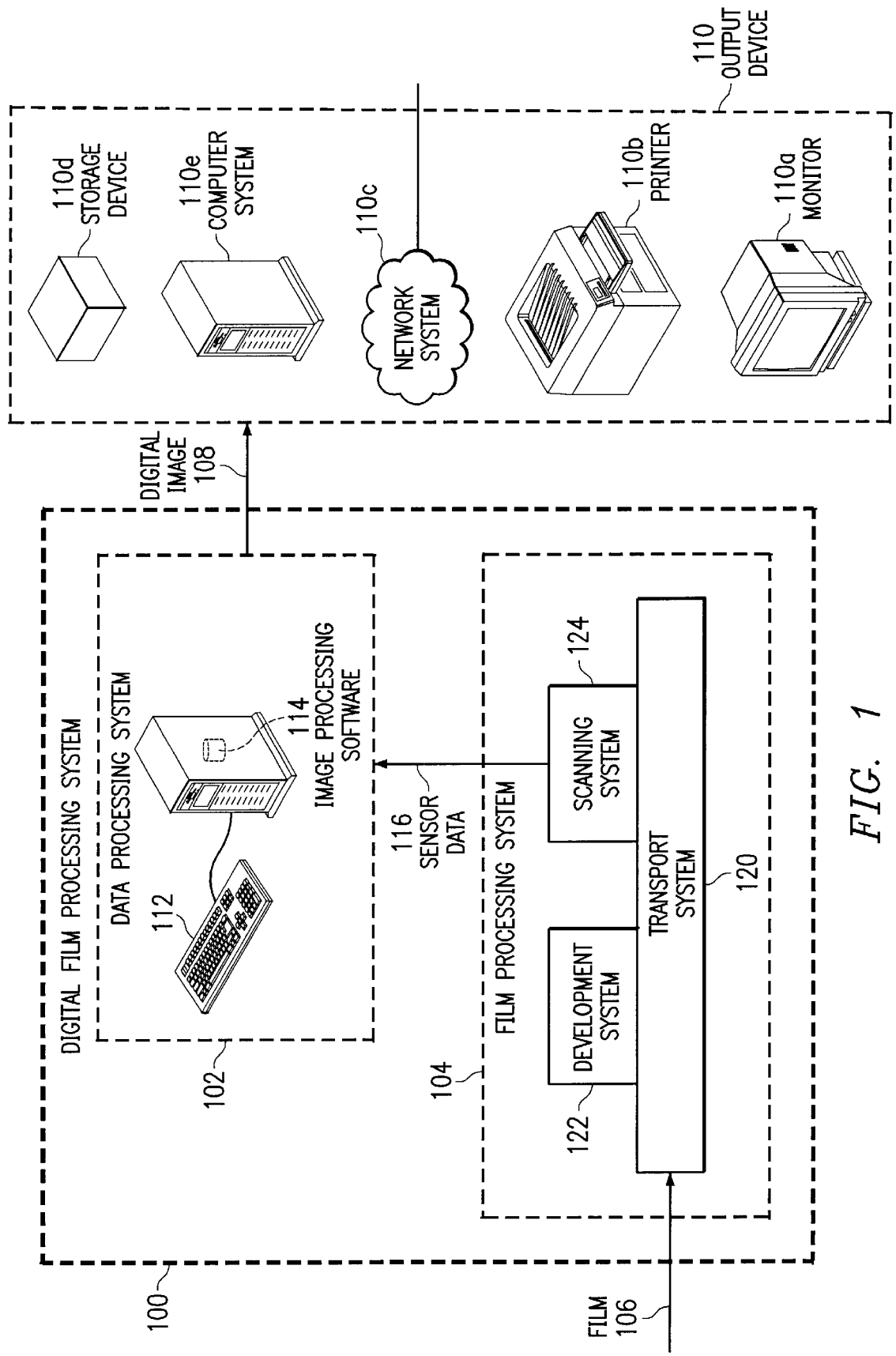
FIG. 1 is a schematic diagram of a digital color dye film processing system in accordance with the invention.

FIG. 1 is a diagram of a digital dye color film processing system 100 in accordance with one embodiment of the invention. In this embodiment, color film processing system 100 comprises a data processing system 102 and a film processing system 104 that develops and scans a film 106 to produce a digital image 108 that can be output to an output device 110. Film 106, as used herein, includes color, black and white, x-ray, infrared or any other type of film and is not meant to refer to any specific type of film or a specific manufacturer.

Data processing system 102 comprises any type of computer or processor operable to process data. For example, data processing system 102 may comprise a personal computer manufactured by Apple Computing, Inc. of Cupertino, California or International Business Machines of New York. Data processing system 102 may also comprise any number of computers or individual processors, such as application specific integrated circuits (ASICs). Data processing system 102 may include an input device 112 operable to allow a user to input information into the color film processing system 100. Although input device 112 is illustrated as a keyboard, input device 112 may comprise any input device, such as a keypad, mouse, point-of-sale device, voice recognition system, memory reading device such as a flash card reader, or any other suitable data input device.

Data processing system 102 includes image processing software 114 resident on the data processing system 102. Film processing system 102 receives sensor data 116 from film processing system 104. As described in greater detail below, sensor data 116 is representative of the colors in the film 106 at each discrete location, or pixel, of the film 106. The sensor data 116 is processed by image processing software 114 to produce the digital image 108. One aspect of image processing software 114 operates to compensate for any occlusions, including opacity, within the film 106. In one embodiment, image processing software 114 operates in a method analogous to that taught in pending U.S. patent application Ser. No. 08/999,421, entitled Defect Channel Nulling, which is incorporated herein by reference. In this embodiment, occlusions, which includes opacity, i.e., cloudiness, within the film 106, is treated as defects and each individual pixel color record is compensated to remove the effect of the occlusions. Digitally compensating for the occlusions in the film 106 instead of washing the chemicals and residues from film 106 substantially reduces or eliminates the production of hazardous chemical effluents that are generally produced during conventional film processing methods. Image processing software 114 may also operate to process the film 106 by correcting for reflections, flare, and other image abnormalities, as well as identifying gutter regions and performing various image enhancement functions. In addition, although the image processing software 114 is described in terms of actual software, the image processing software 114 may be embodied as hardware, such as an ASIC or a data table in firmware, and the like. The color records for each pixel form the digital image 108, which is then communicated to one or more output devices 110.

Output device 110 may comprise any type or combination of suitable devices for displaying, storing, printing, transmitting or otherwise outputting the digital image 108. For example, as illustrated, output device 110 may comprise a display monitor 110a, a printer 110b, a network system 110c, a mass storage device 110c, a computer system 110e, or any other suitable output device. Network system 110c may be any network system, such as the Internet, a local area network, and the like. Mass storage device 110c may be a magnetic or optical storage device, such as a floppy drive, hard drive, removable hard drive, optical drive, CD-R drive, and the like. Computer system 110e may be used to further process or enhance the digital image 108.

As described in greater detail below, the film processing system 104 operates to develop an image in the film 106 and then process the film 106 to substantially remove the visible silver from the film 106. The film processing system 104 then electronically scans the film 106 to produce the sensor data 116. As illustrated, the film processing system 104 comprises a transport system 120, a development system 122, and a scanning system 124.

Transport system 120 operates to dispense film 106 from its cartridge and move the film 106 through the color film processing system 100. In a preferred embodiment, the transport system 120 comprises a leader transport system in which a leader is spliced to the film 106 and a series of rollers pulls the film 106 through the film processing system 104, with care taken that the image surface of the film 106 is not contacted. Similar transport systems 120 are found in film products manufactured by, for example, Noritsu Koki Co. of Wakayama, Japan, and are available to those in the art.

Figure 2A:
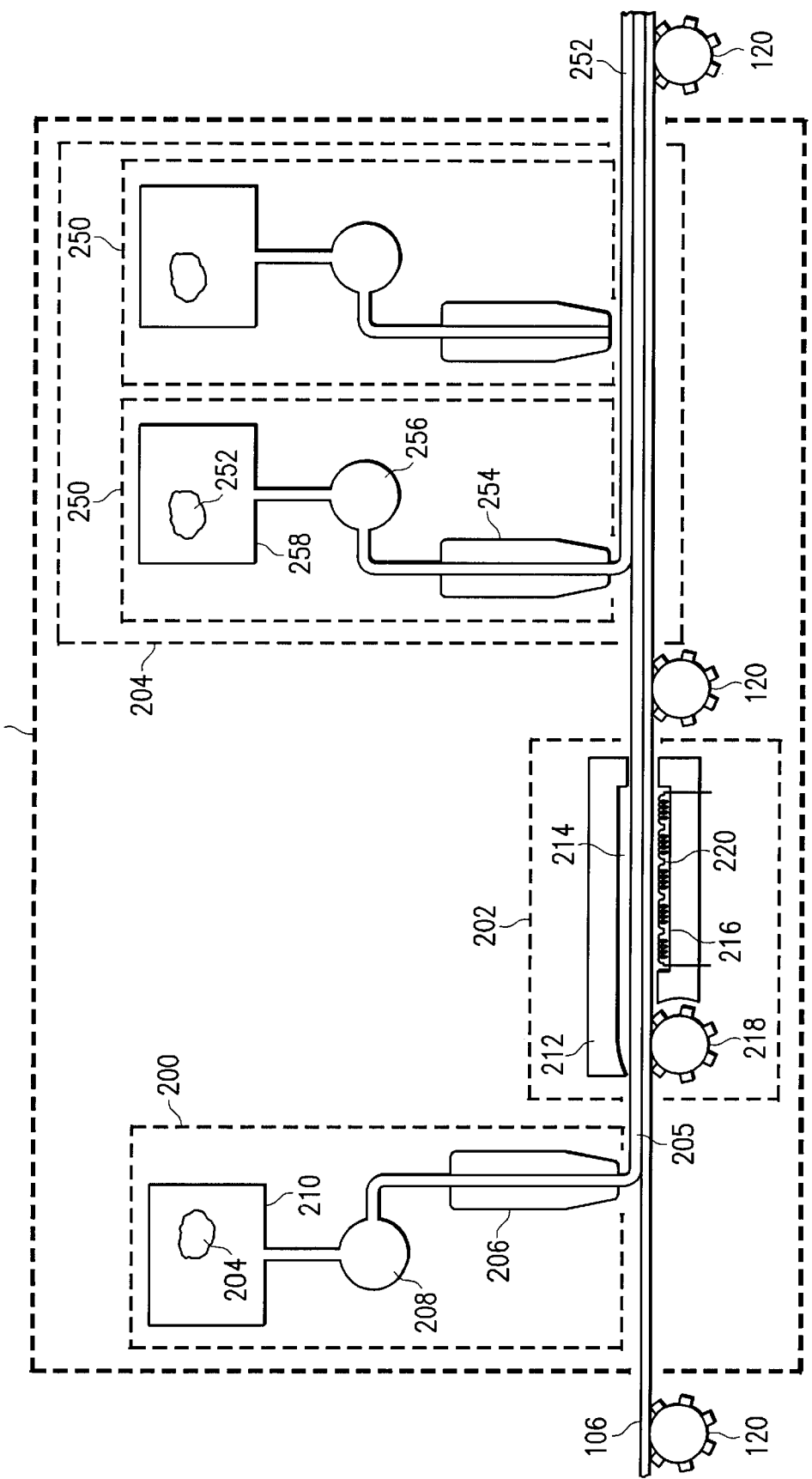
FIG. 2A is a schematic diagram illustrating a development system as shown in FIG. 1.
Figure 2B:
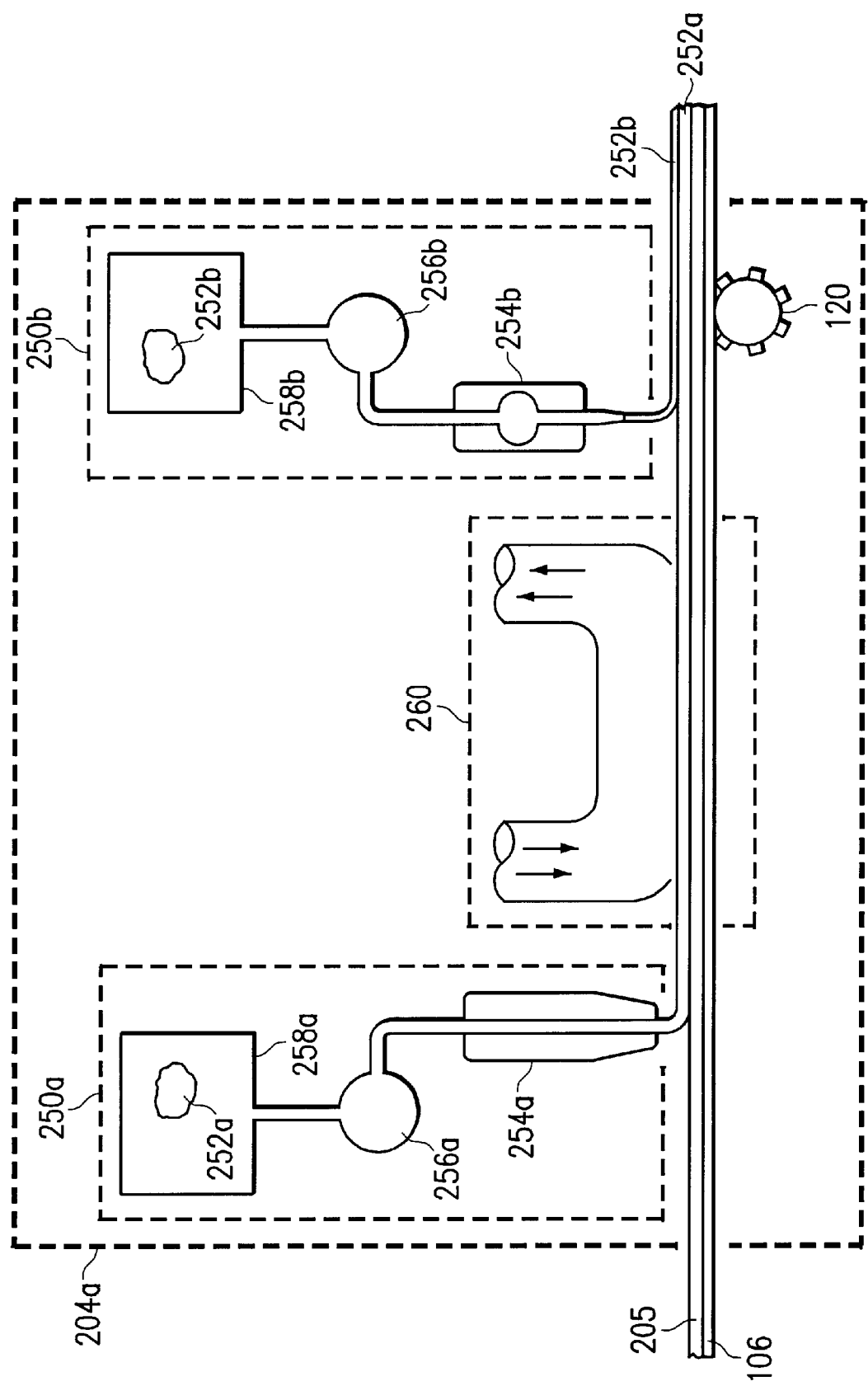

As described in greater detail in FIGS. 2A–2C, the development system 122 operates to develop and process the film 106. Initially, a development solution is applied to the film 106. The development solution acts to produce the dye image and the metallic silver grains within the coated film 106. The film 106 develops within a controlled environment to control the development process of the film 106. When the coated film 106 is fully developed, one or more processing solutions are applied to the coated film 106. The processing solutions operate to substantially modify the metallic silver grains and silver halide to be transparent to light used to scan the film 106.

Figure 3:
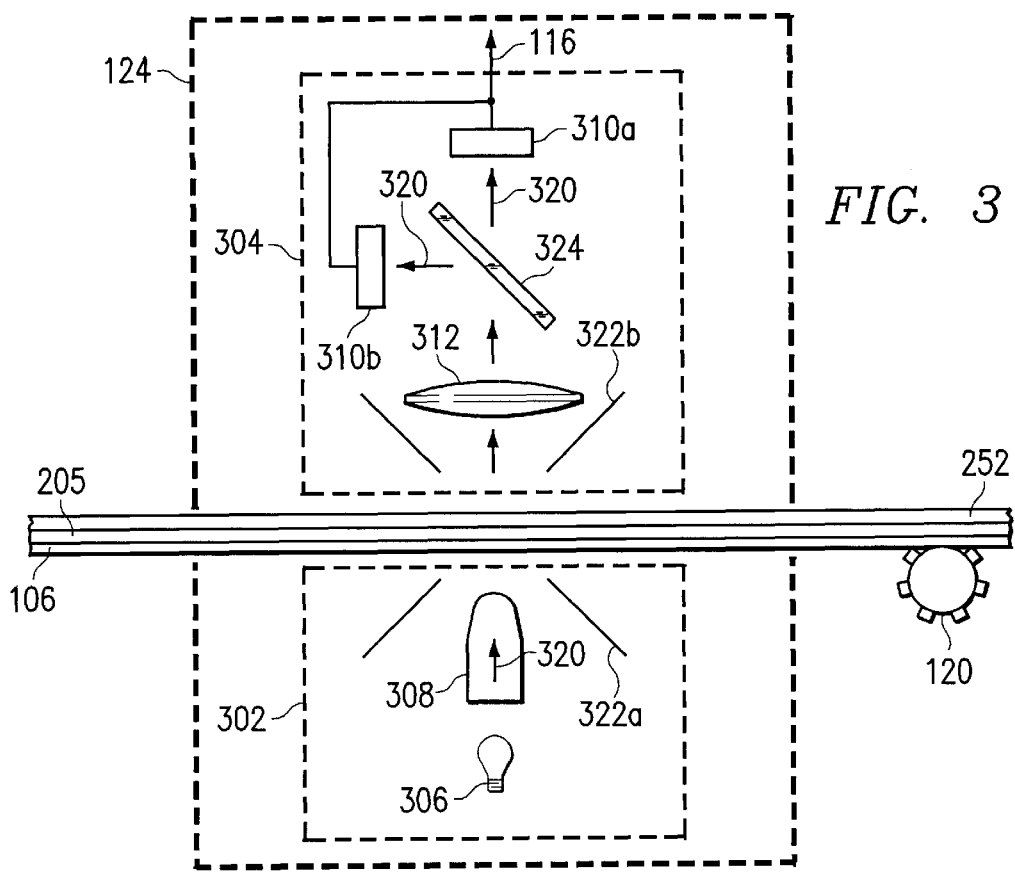
FIG. 3 is a schematic diagram illustrating a scanning system shown in FIG. 1.

As described in greater detail in FIG. 3, the scanning system 124 scans the film 106 through the solutions applied to the film 106. In particular, the developer solution and processing solutions are not removed from the film 106 prior to the scanning process. In contrast, conventional film processing systems remove the developer solution and processing solutions through a series of washes prior to drying the film to create a conventional film negative prior to any digitization process. The scanning station 124 scans the coated film 106. In one embodiment, the scanning station 124 scans the film 106 with visible light. In another embodiment, the scanning station 124 scans the film 106 with visible and infrared light. The visible light measures the intensity associated with the dye images as well as any occlusions within the coated film 106. Occlusions within the coated film 106 may be caused by residual metallic silver grains, residual silver halide, reduced clarity, i.e., opacity, in the coated film 106, or any other optical blockage. In addition to scanning the coated film 106 using visible light, the scanning system 124 may also scan the film 106 using light from other portions of the electromagnetic spectrum. For example, in one embodiment, infrared light is also used to scan the film 106. The dye images are transparent to infrared light. Accordingly, infrared light will only measure the opacity within the film 106. As discussed above, the image data can be modified to compensate for the occlusions in the film 106.

In operation, exposed, but undeveloped film 106 is fed into the transport system 120. The film 106 is transported through the development system 122. The development system 122 applies a development solution to the film 106 that develops the film 106, and then applies additional processing solutions to the coated film 106 to substantially remove the visible silver from the film 106. The transport system 120 moves the film 106 through the scanning system 124. The scanning system 124 scans the coated film 106. Light from the coated film 106 is measured by the sensor system, which produces sensor data 116. The sensor data 116 represents the dye images plus the opacity in the film 106 at each pixel. The sensor data 116 is communicated to data processing system 102. The data processing system 102 processes the sensor data 116 using image processing software 114 to produce the digital image 108. The data processing system 102 may also operate to enhance of otherwise modify the digital image 108. The data processing system 102 communicates the digital image 108 to the output device 110 for viewing, storage, printing, communicating, or any combination of the above.

In a particular embodiment of the color dye film processing system 100, the color dye film processing system 100 is adapted as a self-service film processing system, such as a kiosk. Such a self-service film processing system is uniquely suited to new locations because no plumbing is required to operate the self-service film processing system. In addition, the developed images can be prescreened by the user before they are printed, thereby reducing costs and improving user satisfaction. In addition, the self-service film processing system can be packaged in a relatively small size to reduce the amount of floor space required. As a result of these advantages, a self-service film processing system can be located in hotels, college dorms, airports, copy centers, or any other suitable location. In other embodiments, the digital color dye film processing system 100 may be used for commercial film lab processing applications. Again, because there is no plumbing and the environmental impact of processing the film 106 is substantially reduced or eliminated, the installation cost and the legal liability for operating such a film lab is reduced. The digital dye color film processing system 100 can be adapted to any suitable application without departing from the scope and spirit of the invention. As described in greater detail below, the digital dye color film processing system 100 can also produce a coated film negative that can be returned to the user. Although the coated film negative is not the same as a traditional film negative, the coated film negative can be maintained by the user and can also be scanned at some future date.

FIG. 2A illustrates one embodiment of the development system 122. In this embodiment, the development system 122 comprises an applicator station 200, a development station 202, and a processing station 204. The applicator station 200 operates to apply a relatively uniform coating of a developer solution 205 to the film 106. In one embodiment, the processing solution 205 comprises a viscous color developer solution, such as a developer based on Flexicolor Developer for Process C-41 available from the Eastman Kodak Company.

The applicator station 200 comprises an applicator 206, a fluid delivery system 208, and a reservoir 210. The applicator 206 operates to coat the film 106 with the developer solution 205. In the preferred embodiment, as illustrated, the applicator 206 comprises a slot coater device. In alternative embodiments, the applicator 206 comprises an ink-jet applicator, a tank, an aerosol applicator, drip applicator, or any other suitable device for applying the developer solution 205 to the film 106. The fluid delivery system 208 delivers the developer solution 205 from the reservoir 210 to the applicator 206. In an embodiment in which the applicator 206 comprises a slot coater device, the fluid delivery system 208 generally delivers the developer solution 205 at a constant volumetric flow rate to help insure uniformity of coating of developer solution 205 on the film 106. The reservoir 210 generally contains a sufficient volume of developer solution 205 to process multiple rolls of film 106. In the preferred embodiment, the reservoir 210 comprises a replaceable cartridge. In other embodiments, the reservoir 210 comprises a refillable tank. The applicator station 200 may comprise other suitable systems and devices for applying the developer solution 205 to the film 106.

The development station 202 operates to give the coated film 106 time to fully develop prior to being processed by the processing station 204. In the embodiment illustrated, the development station 202 forms that portion of the transport system 120 between the applicator 206a and the processing station 204. The length of the development station 202 is generally dependent upon the development time of the coated film 106. In particular, depending upon the environment and chemical nature of the developer solution 205, development of the coated film 106 may require as little as a few seconds to as long as several minutes. As illustrated, the development station 202 comprises a cover 212 that protects the film 106 during development. The cover 212 forms an environmental chamber 214 surrounding the film 106. The temperature and humidity within the environmental chamber 214 are controlled. To facilitate controlling the temperature and humidity, the environmental chamber 214 has a minimum volume surrounding the film 106. The cover 212 may also be insulated to maintain a substantially constant temperature as the coated film 106 develops. In order to maintain the temperature, the development station 202 preferably includes a heating system 216. As illustrated, the heating system 216 may include a heated roller 218 and heating element 220. In addition, the heating system 216 may include a developer solution heating system (not expressly shown) that heats the developer solution 205 prior to its application to the film 106.

Processing station 204 comprises one or more treatment stations 250. The treatment stations 250 operate to apply one or more processing solutions 252 to the film 106. The treatment station 250 comprises an applicator 254, a fluid delivery system 256, and a reservoir 258 similar to applicator 206, fluid delivery system 208, and reservoir 210, respectively. The applicator 254 may comprise any suitable device for applying the suitable processing solution 252 to the film 106. The specific type of applicator 254 is generally dependent upon the processing solution 252 to be applied to the film 106. For example, low viscosity processing solutions 252 are readily dispensed by ink-jet applicators and aerosol applicators, whereas high viscosity processing solutions 252 are readily dispensed by slot coater devices and drip applicators. In one embodiment, the excess developer solution 205 and processing solutions 252 are wiped from the film 106. In this embodiment, substantially all of the silver compounds remain within the film 106. In another embodiment, the developer solution 205 and processing solutions 252 are dried on the film 106 and are not washed or otherwise removed from the film 106. In this embodiment, no hazardous chemical effluents are created and the silver is constrained to the film 106. In contrast, environmentally hazardous chemical effluents are produced by conventional wet chemical film processing of film.

The processing solutions 252 operate to modify the metallic silver grains and silver halide to a form that is substantially transparent to the light used to scan the film 106. The preferable process to modify the metallic silver grains and silver halide includes the application of bleach and fixer to the film 106. The bleach operates to oxidize the metallic silver grains within the film 106 to produce silver halide and the fixer dissolves the silver halide within the film 106 to produce a silver compound. The bleach and fixer are generally embodied in one or more aqueous solutions. For example, a bleach solution is available from Eastman Kodak Company under the product name Kodak Flexicolor Bleach for Process C-41, and a fixer solution is also available from Eastman Kodak Company under the product name Kodak Flexicolor Fixer for Process C-41. The particular concentration of bleach and fixer in the respective aqueous solution may be varied in accordance with the particular embodiment of processing station 204. Depending upon the embodiment, the film 106 and the solutions 205, 252 may include residual silver or other contaminates that form an optical occlusion.

Other the modification of the metallic silver grains and silver halide, additional processing solutions 252 may be applied to the film 106. For example, a stabilizer solution, stop solution, or other suitable chemical may also be applied to the film 106. The processing station 204 may also operate to further process the film 106. For example, the processing station 204 may dry the solutions 205, 252 on the film 106. In this embodiment, the film 106 may be saved and potentially scanned in a process similar to a conventional negative. The processing station 204 may also include such other suitable film treatment processes without departing from the scope of the invention. The specific configuration of the processing station 204 is generally dependent upon the types of processing solutions 252 and film treatments applied to the coated film 106. Examples of different embodiments of the processing station 204 are illustrated in FIGS. 2B and 2C.

In operation, transport system 120 transports the film 106 through the applicator station 200. The fluid delivery system 208 dispenses the developer solution 205 from the reservoir 210 through the applicator 206 onto the film 106. The developer solution 205 develops the exposed silver halide grains to produce dye images and metallic silver grains within the film 106. The coated film 106 is then transported through the development station 202. As discussed above, the development station 202 allows the film 106 time to fully develop within a controlled environment. The coated film 106 is then transported by the transport system 120 to the processing station 204. One or more treatment stations 250 apply processing solutions 252 to the film 106. The processing solutions 252 operate to substantially modify the metallic silver grains and the silver halide crystals in the film 106. In the preferred embodiment, the transport system 120 then advances the coated (developer solution 205 and processing solutions 252) film 106 to the scanning system 124. As described above, neither the developer solution 205, nor the processing solution 252 is removed from the film 106, but remains on the film 106 as the film 106 is transported to the scanning system 124. In another embodiment, any excess developer solution 205 and processing solution 252 is wiped from the film 106. In this embodiment, neither the developer solution 205 nor the processing solution 252 is washed from the film 106, which would produce environmentally hazardous effluents.

FIG. 2B illustrates a processing station 204*a* having a treatment station 250*a* operable to apply a processing solution 252*a* to the coated film 106. As illustrated, the treatment station 250*a* comprises an applicator 254*a*, a fluid delivery system 256*a*, and a reservoir 258*a*. The applicator 254*a* is preferably a slot coater device for applying a coating of the processing solution 252*a* to the coated film 106. In the preferred embodiment, the processing solution 252*a* comprises a blix solution. A blix solution is a mixture of bleach and fixer solutions, such as Kodak Ektacolor RA bleach-fix available from Eastman Kodak Company. As discussed previously, bleach converts the metallic silver grains in the film 106 to silver halide, and the fixer dissolves the silver halide in the film 106. In addition to removing the metallic silver grains and silver halide, applying the blix processing solution 252*a* to the coated film 106 also substantially stops the continued development of the film 106. This also desensitizes the film 106 to light and allows the film 106 to be scanned with visible light 320 without fogging the film 106.

The processing station 204*a* may also include an optional drying system 260. The drying system 260 operates to dry the solutions 205, 252*a* on the coated film 106. As illustrated, the drying system 260 circulates air over the film 106 to dry the solutions 205, 252*a*. The drying system 260 may comprise any other suitable system for drying the film 106. For example, the drying system 260 may include a heating element for heating the film 106.

The processing system 204*a* may also include an optional treatment station 250*b*. The optional treatment station 250*b* operates to apply a stabilizer processing solution 252*b* to the film 106. The optional treatment station 250*b* includes an applicator 254*b*, a fluid delivery system 256*b*, and a reservoir 258*b*. In the preferred embodiment, the applicator 254*b* is an ink-jet applicator. The ink-jet applicator 254*b* applies a thin coating of the stabilizer solution 252*b* to the film 106. The stabilizer processing solution 252*b* dries and seals the film 106 to protect the film 106 and seal the silver within the film 106. As a result, the film 106 can be preserved as a coated film negative. A coated film negative is not the same as a conventional film negative, as the coated film negative has substantially all the silver compounds remaining within the coated film negative.

FIG. 2C illustrates a processing station 204*b* having a first and second treatment station 250*c*, 250*d* operable to apply a first and second processing solution 252c, 252d to the coated film. In this embodiment, the first and second treatment stations 250c, 250d are similar to the treatment station 250. In the preferred embodiment, the first processing solution 252c comprises a bleach solution, and the second processing solution 252d comprises a fixer solution. Applying the bleach processing solution 252c prior to the fixer processing solution 252d allows the metallic silver grains to be fully oxidized. The fixer processing solution 252d then dissolves the silver halide formed by oxidizing the metallic silver grains and the undeveloped silver halide within the film 106. As a result, the oxidization and dissolving of the silver can be optimally controlled. In addition, development of the film 106 is stopped by the application of the fixer processing solution 252d. Furthermore, application of the fixer processing solution 252d to the film 106 desensitizes the film 106 to visible light.

In one embodiment, the concentration of the bleach processing solution 252c and/or the fixer processing solution 252d is increased as compared to conventional wet chemical film processing. In one embodiment, the concentration of the bleach processing solution 252c and the fixer processing solution 252d are increased by a factor of 1× to 4×. In an embodiment for accelerating the chemical reaction, the concentration of the bleach processing solution 252c and the fixer processing solution 252d is increased by a factor greater than 4×. Increasing the concentration allows a smaller volume of processing solutions 252c, 252d to be applied to the film 106 and permits faster processing, and more complete processing at lower temperatures. The processing solutions 252c, 252d take advantage of the developer solution 205 applied to the film 106. As a result, the volume of solutions 205, 252c, 252d applied to the film 106 is minimized, which decreases the probability of any solutions running off the film 106.

The processing station 204b may include an optional drying system 260, as described in FIG. 2B. The processing system 204b may also include an optional treatment station 250b that operates to apply a stabilizer solution to the film 106, as described in FIG. 2B. Although specific embodiments of the processing station 204 have been described, the processing station 204 may comprise additional processing solutions or other suitable treatments, as well as other suitable devices and systems for processing the film 106. For example, the processing station 204 may include a chiller that chills the film 106 to slow the development of the film 106 prior to the application of any processing solutions 252 (or prior to scanning).

FIG. 3 is a diagram of the scanning system 124. Scanning system 124 comprises a lighting system 302 and a sensor system 304. The lighting system 302 includes one or more light sources 306 and optional optics 308. The sensor system 304 includes one or more detectors 310 and optional optics 312. In the preferred embodiment of the scanning system 124, the lighting system 302 produces suitable light 320 that is transmitted through the film 106 and measured by the sensor system 304. The sensor system 304 produces sensor data 116 that is communicated to the data processing system 102. Although FIG. 3 illustrates the light 320 being transmitted through the film 106 from the back side to the front side of the film 106, the light 320 can also be transmitted through the film 106 from the front side to the back side of the film 106 without departing from the scope of the invention.

The lighting system 302 produces light 320, i.e., electromagnetic radiation, to scan the film 106. The lighting system 302 may have different embodiments and scan the film 106 using different colors, or frequency bands, and color combinations. In particular, different colors of light interact differently with the film 106. Visible light interacts with the dye images and any occlusions on or in the film 106. Whereas, infrared light interacts with the occlusions, but the dye image is generally transparent to infrared light. The term "color" is used to generally describe specific frequency bands of electromagnetic radiation, including visible and non-visible light.

Visible light, as used herein, means electromagnetic radiation having a frequency or frequency band generally within the electromagnetic spectrum of near infrared light (>700 nm) to near ultraviolet light (<400 nm). Visible light can be separated into specific bandwidths. For example, the color red is generally associated with light within a frequency band of approximately 600 nm to 700 nm, the color green is generally associated with light within a frequency band of approximately 500 nm to 600 nm, and the color blue is generally associated with light within a frequency band of approximately 400 nm to 500 nm. Near infrared light is generally associated with radiation within a frequency band of approximately 700 nm to 1500 nm. Although specific colors and frequency bands are described herein, the scanning station 300 may utilize other suitable colors and frequency ranges without departing from the spirit and scope of the invention.

The light source 306 may comprise one or more devices or system that produces suitable light 320. In the preferred embodiment, the light source 306 comprises a broad spectrum light source 306 that produces visible and infrared light 320, such as a fluorescent, incandescent, tungsten-halogen, direct gas discharge lamps, and the like. Broadband light sources are generally used in conjunction with wavelength-band specific sensors, or broadband sensors with appropriate light filtration. In another embodiment, the light source 306 comprises an array of light-emitting diodes (LEDs). The LEDs may comprise filters or other such suitable wavelength modifiers to produce individual colors of light 320. In yet another embodiment, the light source 306 comprises a point light source, such as a laser. For example, the point light source may be a gallium arsenide or an indium gallium phosphide laser. In this embodiment, the width of the laser beam is preferably the same size as a pixel on the film 106 (~12 microns). Filters, such as a color wheel, or other suitable wavelength modifiers or limiters maybe used to produce the specified color or colors of light 320.

Optional optics 308 for the lighting system 302 directs the light 320 to the film 106. In the preferred embodiment, the optics 308 comprises a waveguide that directs the light 320 onto the film 106. In other embodiment, the optics 320 includes a lens system for focusing the light 320. In a particular embodiment, the lens system and light source 306 include a polarizing filters to condition the light 320. The optics 308 may also include a light baffle 322a. The light baffle 322a constrains illumination of the light 320 within a scan area in order to reduce light leakage that could cause fogging of the film 106. In one embodiment, the light baffle 322a comprises a coated member adjacent the film 106. The coating is generally a light absorbing material to prevent reflecting light 320 that could cause fogging of the film 106.

The detector 310 comprises one or more photodetectors that convert light 320 from the film 106 into data signals 116. In one embodiment, the detector 310 comprises a charge coupled device (CCD) array. In a particular embodiment, the detector 310 comprises a RGB tri-linear array. In this embodiment, the RGB tri-linear array includes individual red, green, and blue filters over separate lines of the array.

This allows the simultaneous measurement of the red, green, and blue components of the visible light 320. In another embodiment, the detector 310 comprises an area array. In this embodiment, the area array allows the simultaneous measurement of a relatively large area of the film 106. The detector 310 may comprise other suitable photodetectors, such as photodiode, phototransistor, photoresistor, and the like. The detector 310 may also include suitable filters to limit the bandwidth, or color, detected by individual photodetectors.

In a particular embodiment, the detector 310 comprises optional first detector 310*a* and optional second detector 310*b*. In this embodiment, the optional optics 312 includes a hot mirror 324, as described below, to separate the visible light 320 from the infrared light 320. The first detector 310*a* operates to measure visible light 320, and the second detector 310*b* operates to measure infrared light 320. The detector 310*a* preferably comprises a RGB tri-linear array. The second detector 310*b* preferably comprises a linear array optimized to measure infrared light 320. The second detector 310*b* does not generally include filters, as the detector 310*b* is measuring only infrared light 320. However suitable filters may be used to control the infrared bandpass Optional optics 312 for the sensor system 304 directs the light 320 from the film 106 onto the detector 310. In one embodiment, the optics 312 comprises a lens system that directs the light 320 from the film 106 onto the detector 310. The optional optics 312 (and light source 306) may also include polarized lenses to reduce the effects of specular reflection. The optics 312 may also include a light baffle 322*b*. The light baffle 322*b* is similar in function to light baffle 322*a* to help prevent fogging of the film 106.

In a particular embodiment, the optional optics 312 includes optional hot mirror 324. The hot mirror 324 separates the infrared light 320 from the visible light 320. Specifically, the infrared light 320 is reflected by the hot mirror 324, and the visible light 320 is transmitted through the hot mirror 324. Accordingly, the visible light 320 is optimally focused on the RGB tri-linear array 310*a* and the infrared light 320 is optimally focused on the linear array 310*b*. Thereby improving the accuracy of both the visible and infrared light 320 measurements. In another embodiment, a cold mirror (not expressly shown) is used instead of the hot mirror 324. The cold mirror reflects visible light 320 and transmits infrared light 320.

In one embodiment of the scanning system 124, the light 320 produced by the lighting system 302 comprises visible light and the sensor system 304 comprises a RGB tri-linear array sensor. In this embodiment, the visible light 320 is transmitted through the coated film 106 and measured by the RGB tri-linear array sensor system 304. The visible light 320 interacts with at least one dye image, i.e. the cyan, magenta, or yellow dye images, within the film 106. The RGB tri-linear array sensor system 304 measures the red, green, and blue components of the light 320 transmitted through the film 106 and produces a red, green and blue record corresponding to each pixel in the film 106. The records form the sensor data 116 that is communicated to the data processing system 102. The data processing system 102 processes the sensor data 116 to produce the digital image 108. A variant of this embodiment comprises a lighting system 302 that produces pulses of red, green and blue light, and the sensor system 304 comprises a linear sensor array sensor operable to measure the pulses of light 320. In this embodiment, the color of the light 320 changes and linear sensor array sensor system 304 measures the respective light pulses.

In another embodiment of the scanning system 124, the light 320 produced by the lighting system 302 comprises visible light and infrared light transmitted through the film 106. The visible light 320 interacts with any occlusions and at least one dye image, i.e. the cyan, magenta, or yellow dye images, within the film 106, and the infrared light 320 interacts with any occlusions in the film 106. The light 320 transmitted through the film 106 is focused by optional optics 312 through the hot mirror 324. The visible light 320 is transmitted through the hot mirror 324 and is focused on the first detector 310*a*. The infrared light 320 is reflected by the hot mirror 324 and focused onto the second detector 310*b*. The first detector 310*a* measures the red, green, and blue components of visible light 320 and produces respective red, green, and blue records. The red, green, and blue records include information relating to the intensity of the respective color and any occlusions within the film 106. The second detector 310*b* measures the infrared light signal and produces an infrared record. The infrared record includes information relating only to the occlusions within the film 106. Based on the red, green, blue, and infrared records, the negative effect of the occlusions in the film 106 can be substantially eliminated within the red, green and blue records. This embodiment is analogous to the defect correction electronic scanners described in U.S. Pat. No. 5,266,805, entitled System and Method for Image Recovery, which is incorporated herein by reference. The amount of occlusion is used as a basis for modifying the individual color records. For example, in pixels having a high density of occlusions, the individual color records are significantly increased, whereas in pixels having a low density of occlusions, the individual color records are relatively unchanged.

As illustrated, different architectures and embodiments of the scanning system 124 may scan the film 106 differently. In particular, the lighting system 302 and sensor system 304 operate in concert to illuminate and sense the light 320 from the film 106 to produce suitable sensor data 116. In one embodiment, the lighting system 302 separately applies distinct colors of light 320 or color combination of light 320 to film 106. In this embodiment, the sensor system 304 generally comprises a non-filtered detector 310 that measures in series the corresponding colors of light 320 from the film 106. In another embodiment, multiple unique color combinations are simultaneously applied to the film 106, and individual color records are derived from the sensor data 116. In another embodiment, the lighting system 302 simultaneously applies multiple colors of light 320 to the film 106. In this embodiment, the sensor system 304 generally comprises a filtered detector 310 that allows the simultaneous measurement of individual colors of light 320. Other suitable scanning methods may be used to obtain the required color records.

Figure 4:
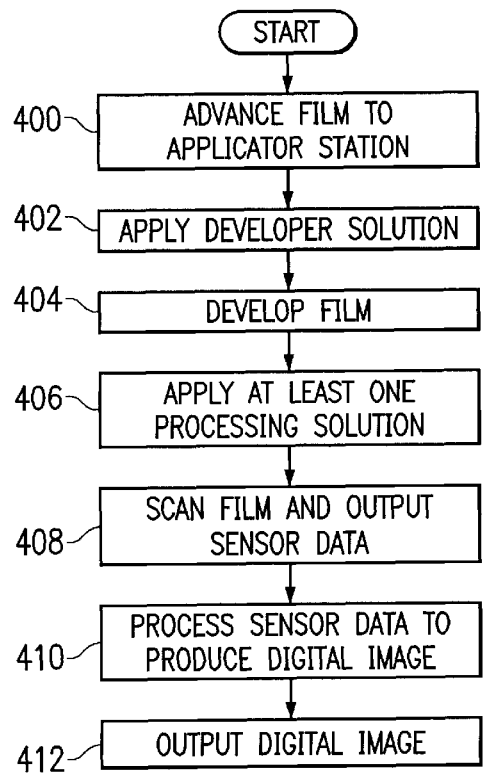
FIG. 4 is a flow chart illustrating a method of digital color dye film processing in accordance with the invention.

FIG. 4 is a flowchart of one embodiment of a method for developing and processing film. This method may be used in conjunction with one or more embodiments of the digital color dye film processing system 100 that includes a data processing system 102 and a film processing system 104 having a transport system 120, a development system 122, and a scanning system 124. The development system 122 includes an applicator station 200 for applying a processing solution 205 to the film 106 and a development station 202. The scanning system 124 comprises a light system 302 that produces light 320. The light 320 is transmitted through the film 106 and measured by the sensor system 304. The sensor system 304 produces sensor data 116 that is communicated to the data processing system 102. The data processing system 102 processes the sensor data 116 to produce a digital image 108 that may then be output to an output device 110.

The method begins at step 400, where the transport system 120 advances the film 106 to the applicator station 200. Film 106 is generally fed from a conventional film cartridge and advanced by the transport system 120 through the various stations of the film processing system 104. At step 402, processing solution 205 is applied to the film 106. The processing solution 205 initiates production of silver and at least one dye image within the film 106. The processing solution 205 is generally applied as a thin coating onto the film 106, which is absorbed by the film 106. At step 404, the film 106 is advanced through the development station 202 where the dye images and silver grains develop within the film 106. The environmental conditions, such as the temperature and humidity, are generally controlled within development station 202. This allows the film 106 to develop in a controlled manner and provides the proper development time for the film 106. At step 406, at least one processing solution 252 is applied to the coated film 106 at one or more treatment stations 250. In one embodiment, a blix processing solutions 252a is applied to the film 106. The blix processing solution 252a comprises a mixture of bleach and fixer solutions. In another embodiment, a bleach processing solution 252c and a fixer processing solution 252d is applied separately to the film 106. The blix, or bleach and fixer solutions 252 interact with the metallic silver grains and the silver halide in the film 106 to produce a silver compound that is substantially transparent to light 320. Additional treatment stations 250 may be used to apply other processing solutions 252 to the film 106. For example, a stabilizer processing solution 252b may be applied to the film 106. The film 106 may also be further processed. For example, the film 106 may be dried at any time during the process. At step 408, the film 106 is scanned by the scanning system 124 using light 320. In one embodiment, the light 320 measured by the sensor system 304 comprises visible light. The visible light interacts with at least one dye image within the film 106 and also with any occlusions within the film 106. Depending upon the processing station 204, there may be very few occlusions. In this case, scanning only with visible light 320 produces adequate sensor data 116 to produce a digital image 108. In another embodiment, the light 320 used to scan the film 106 comprises visible light and infrared light. Infrared light interacts with any occlusions in the film 106, but is substantially unaffected by the dye images within the film 106. Sensor data 116 is produced by the scanning system 124 and communicated the data processing system 102. At step 410, the sensor data 116 is processed to produce the digital image 108. The data processing system 102 includes image processing software 114 that processes the sensor data 116 to produce the digital image 108. The digital image 108 represents the photographic image recorded on the film 106. At step 412, the digital image 108 is output to one or more output devices 110, such as monitor 110a, printer 110b, network system 110c, storage device 110d, computer system 110e, and the like.

While the invention has been particularly shown and described in the foregoing detailed description, it will be understood by those skilled in the art that various other changes in form and detail may be made without departing from the spirit and scope of the invention.

What is claimed is:

1. A digital dye color film processing system for developing and scanning silver halide based film without producing liquid chemical effluents, the system comprising:

an applicator station operable to coat a thin film of developer solution on the film wherein the development solution interacts with the exposed silver halide within the film to produce metallic silver grains and at least one dye image;

a processing station operable to coat at least one processing solution on the film, wherein the at least one processing solution substantially modifies the metallic silver grains and the silver halide to produce a substantially transparent silver compound;

a scanning system operable to scan the film coated with the developer solution and the at least one processing solution using visible light to produce sensor data corresponding to the at least one dye image; and a data processing system operable to receive and process the sensor data to produce a digital image.

2. The system of claim 1, wherein the scanning system operates to scan the film solely with visible light.

3. The system of claim 1, wherein the scanning system operates to scan the film with visible and infrared light.

4. The system of claim 3, wherein the scanning system operates to separate the visible light and infrared light from the film.

5. The system of claim 4, wherein the scanning system includes a hot mirror.

6. The system of claim 4, wherein the scanning system includes a cold mirror.

7. The system of claim 1, wherein the at least one processing solution comprises a blix processing solution.

8. The system of claim 1, wherein the at least one processing solution comprises a bleach processing solution and a fixer processing solution.

9. The system of claim 1, wherein the at least one processing solution comprises a stabilizer processing solution.

10. The system of claim 1, wherein the processing station also operates to dry the developer solution and the at least one processing solution on the film.

11. The system of claim 1, wherein the applicator station includes a slot coater device operable to coat the developer solution on the film.

12. The system of claim 1, wherein the digital dye color film processing system is embodied in a self-service kiosk.

13. The system of claim 1, wherein the digital dye color film processing system is embodied in a photofinishing lab.

14. The system of claim 1, wherein the scanning system includes a red-green-blue tri-linear array sensor.

15. A system for processing silver halide based film, the system comprising:

an applicator station operable to apply a developer solution onto a film, wherein the development solution interacts with the silver halide in the film to develop metallic silver grains and at least one dye image within the film;

a development station operable to substantially control the environment surrounding the film during development of the film; and a processing station operable to apply at least one processing solution to the film, wherein the at least one processing solution substantially modifies the metallic silver grains and silver halide to produce a substantially transparent silver compound that remains substantially on the film and does not produce liquid chemical effluents.

16. The system of claim 15, wherein the applicator station includes a slot coater device operable to coat the developer solution onto the film.

17. The system of claim 15, wherein the at least one processing solution comprises a blix processing solution.

18. The system of claim 15, wherein the at least one processing solution comprises a bleach processing solution and a fixer processing solution.

19. The system of claim 15, wherein the processing station also operates to apply a stabilizer processing solution to the film.

20. The system of claim 15, wherein the processing station also operates to dry the film.

21. The system of claim 15, wherein the development station includes a heating system.

22. The system of claim 15, wherein the development station includes an insulated cover.

23. The system of claim 15, further comprising a leader transport system operable to transport the film through the applicator station, development station, and processing station.

24. The system of claim 15, further comprising:
a scanning system operable to scan the film coated with the developer solution and the at least one processing solution to produce sensor data; and
a data processing system operable to receive and process the sensor data to produce a digital image.

25. The system of claim 24, wherein the scanning system operates to scan the film solely with visible light.

26. The system of claim 24, wherein the scanning system operates to scan the film with visible and infrared light.

27. The system of claim 26, wherein the scanning system includes a mirror operable to separate the visible light and infrared light.

28. The system of claim 27, wherein the mirror comprises a hot mirror.

29. The system of claim 27, wherein the mirror comprises a cold mirror.

30. A system for digitizing a developed film, the system comprising:
a lighting system operable to illuminate developed film coated with a developer solution and at least one processing solution with light within at least a portion of the visible light spectrum; and
a sensor system operable to measure the illumination from the film and produce sensor data.

31. The system of claim 30, wherein the illumination produced by the lighting system comprises visible and infrared light.

32. The system of claim 30, wherein the sensor system operates to measure solely visible light transmitted though the film.

33. The system of claim 30, wherein the sensor system operates to measure visible and infrared light transmitted through the film.

34. The system of claim 33, wherein the sensor system includes a mirror for separating the visible light and the infrared light.

35. The system of claim 34, wherein the mirror comprises a hot mirror.

36. The system of claim 33, wherein the sensor system comprises a first detector operable to measure the visible light, and a second detector operable to measure the infrared light.

37. The system of claim 36, wherein first detector comprises a RGB tri-linear array sensor.

38. The system of claim 30, wherein the at least one processing solution comprises a blix processing solution.

39. The system of claim 30, wherein the at least one processing solution comprises a bleach processing solution and a fixer processing solution.

40. The system of claim 30, wherein the at least one processing solution includes a stabilizer processing solution.

41. The system of claim 30, wherein the developer solution and the at least one processing solution are dried on the film.

42. The system of claim 30, further comprising a data processing system operable to receive and process the sensor data to compensate for any occlusions within the film, and produce a corrected digital image.

43. The system of claim 42, wherein the corrected digital image is operable to be output to a printer.

44. The system of claim 42, wherein the corrected digital image is operable to be output to a memory device.

45. The system of claim 42, wherein the corrected digital image is operable to be output to the Internet.

46. A method for digitizing film, the method comprising:
illuminating a film coated with a developer solution and at least one processing solution with light within at least a portion of the visible light spectrum; and
measuring the illumination from the film and producing sensor data.

47. The method of claim 46, wherein illuminating a film with a developer solution and at least one processing solution comprises illuminating a film coated with a developer solution and at least one processing solution using solely visible light.

48. The method of claim 46, wherein illuminating a film with a developer solution and at least one processing solution and producing sensor data comprises illuminating a film coated with a developer solution and at least one processing solution using visible and infrared light and producing sensor data.

49. The method of claim 48, wherein measuring the illumination from the film and producing sensor data comprises:
separating the visible light illumination from the infrared light illumination using a mirror; and
measuring the visible light illumination and infrared light illumination.

50. The method of claim 49, wherein the mirror comprises a hot mirror.

51. The method of claim 49, wherein the mirror comprises a cold mirror.

52. The method of claim 46, wherein measuring the illumination from the film and producing sensor data comprises measuring illumination within the visible and infrared portion of the electromagnetic spectrum transmitted through the film and producing sensor data.

53. The method of claim 46, further comprising processing the sensor data to compensate for any occlusions within the film to produce a corrected digital image.

54. The method of claim 53, further comprising printing the corrected digital image.

55. The method of claim 53, further comprising storing the corrected digital image.

56. The method of claim 53, further comprising communicating the corrected digital image over the Internet.

57. The method of claim 46, wherein the at least one processing solution comprises a blix processing solution.

58. The method of claim 46, wherein the at least one processing solution comprises a bleach processing solution and a fixer processing solution.

59. The method of claim 46, wherein the at least one processing solution comprises a stabilizer processing solution.

60. A method for developing and digitizing exposed film having multiple emulsion layers containing silver halide, the method comprising:
applying a developer solution to the film to initiate production of metallic silver grains and a dye image within the film;

applying at least one processing solution to the film, the processing solution operable to, at least in part, oxidize the metallic silver grains and dissolve the silver halide in the film;

scanning the coated film with light within at least a portion of the visible light spectrum without removing the developer solution and the at least one processing solution and outputting sensor data; and processing the sensor data to produce a digital image.

61. The method of claim 60, wherein the at least one processing solution comprises a blix processing solution.

62. The method of claim 60, wherein the at least one processing solution comprises a bleach processing solution and a fixer processing solution.

63. The method of claim 60, wherein the light comprises visible and infrared light.

64. The method of claim 63, wherein scanning the coated film with visible and infrared light and outputting sensor data comprises:

separating the visible light from the infrared light using a mirror; and measuring the visible light illumination and infrared light illumination.

65. The method of claim 64, wherein the mirror comprises a hot mirror.

66. The method of claim 60, wherein processing the sensor data to produce a digital image comprises processing the sensor data to compensate for any occlusions within the film to produce digital image.

67. The method of claim 60, further comprising displaying the digital image.

68. The method of claim 60, further comprising storing the digital image.

69. The method of claim 60, further comprising communicating the digital image over the Internet.

70. The method of claim 60, wherein the sensor data comprises red, green, blue and infrared records for each pixel.

71. The method of claim 70, wherein processing the sensor data to produce a digital image comprises:

calculating a correction factor for each pixel based on the infrared record; and applying the correction factor to the red, green, and blue records for each pixel to produce a digital image.

72. The method of claim 60, further comprising drying the coated film prior to scanning the coated film.

73. A coated film negative produced by a process comprising:

applying a developer solution to a film having silver halide to initiate development of metallic silver grains and a dye image within the film;

applying at least one processing solution to the film, the processing solution operable to oxidize the metallic silver grains and dissolve the silver halide in the film; and drying the developer solution and the at least one processing solution on the film to produce the coated film negative.

74. The coated film negative of claim 73, wherein the at least one processing solutions comprises a blix solution.

75. The coated film negative of claim 73, wherein the at least one processing solution comprises a bleach processing solution and a fixer processing solution.

76. A digital image produced by a process comprising:

illuminating a film coated with a developer solution and at least one processing solution;

measuring the illumination from the film and producing sensor data processing the sensor data to produce the digital image.

77. The digital image of claim 76, wherein the illumination comprises visible and infrared light.

78. The digital image of claim 76, wherein processing the sensor data to produce the digital image comprises processing the sensor data to compensate for any occlusions within the film to produce the digital image.

* * * * *